April 24, 1945. C. W. CANNON 2,374,584
PULVERULENT MATERIALS-HANDLING AND STORAGE SYSTEM
Filed Feb. 26, 1944
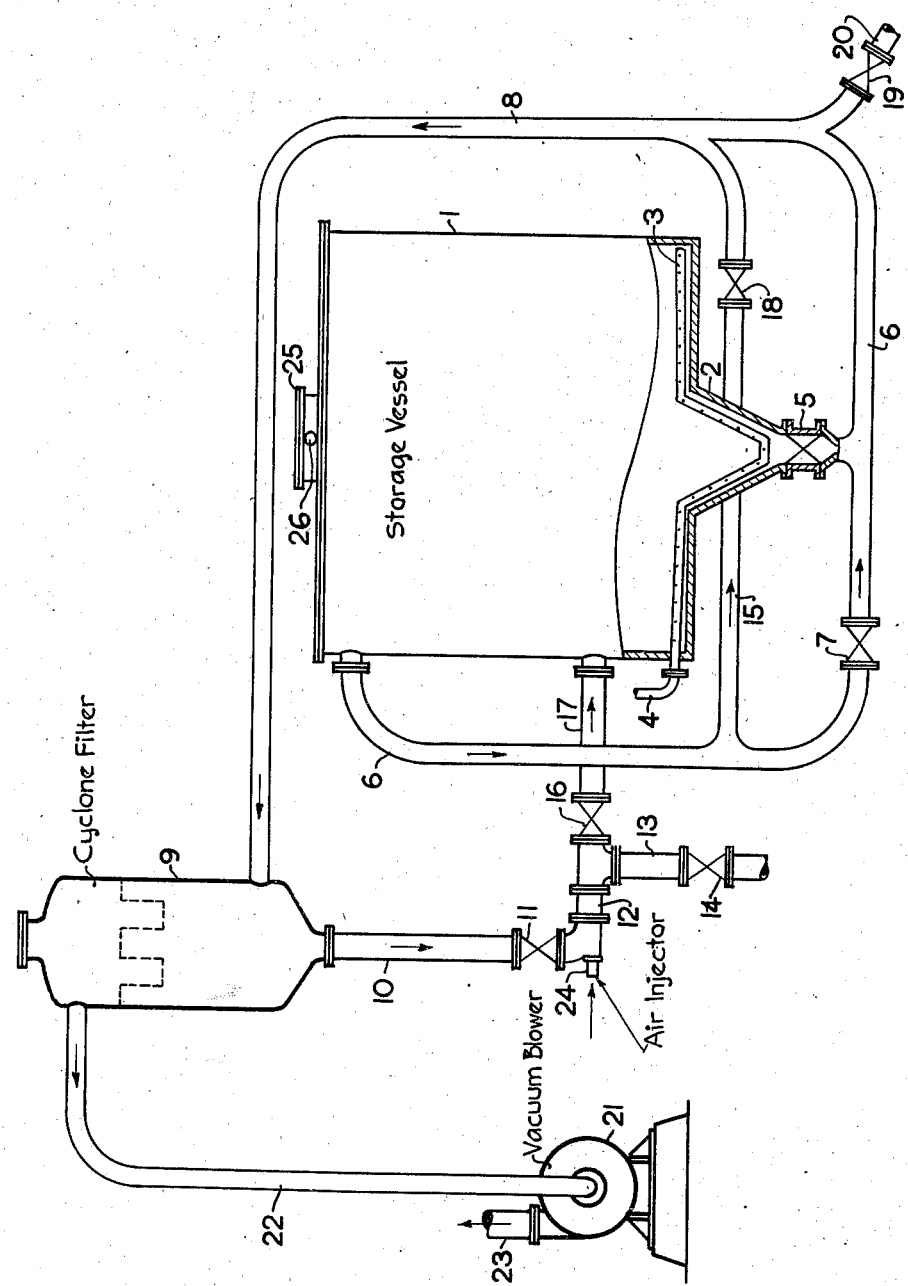
Inventor: Curtis W. Cannon
By his Attorney:

Patented Apr. 24, 1945

2,374,584

UNITED STATES PATENT OFFICE 2,374,584

PULVERULENT MATERIALS-HANDLING AND STORAGE SYSTEM

Curtis W. Cannon, Hartsdale, N. Y., assignor to Shell Development Company, San Francisco, Calif., a corporation of Delaware Application February 26, 1944, Serial No. 524,137

8 Claims. (Cl. 302—17)

The present invention relates to equipment suitable for handling and storing pulverulent materials, more particularly to equipment suitable for the handling and storage of fluid catalyst materials.

There are various processes in use at present in carrying out chemical conversions and reactions by means of fluid catalysts, as for example, the cracking, reforming, hydrogenation, dehydrogenation, cyclization, aromatization, alkylation, isoforming, polymerization, desulfurization etc. of petroleum products, coal-tar products and allied materials. In such processes, catalyst particles of a size of the order of 350 microns and finer are generally passed in continuous concurrent or countercurrent contact with gaseous material which is to be reacted or converted, the catalyst particles and reaction products separated and the catalyst regenerated in a separate zone before being returned to the reaction zone, the catalyst being transported through the various parts of the system by means of a gas or vapor while in a "fluidized" condition. As a result of the inevitable losses of catalyst from such systems due to fining and other factors, it is necessary and desirable to maintain storage and handling facilities at or near plants operating on the fluid catalyst principle in order that fresh catalyst may be supplied as required. The conventional storage supply systems comprise large elevated bins each usually capable of holding some 250 tons of catalyst. The purpose in elevating the bins is to provide adequate standpipe head to permit pneumatic conveyance from the bins to the reaction vessels. Aeration is provided at the base of the bins to fluidize the powdered catalyst mass and the escape air passes through a cyclone filter to prevent loss of entrained catalyst. These elevated bins must be constructed pressure tight to withstand the static pressure head developed by the fluidized catalyst and the back pressure of the cyclone filter.

It is an object of the present invention to provide ground level storage and handling facilities for fluid catalysts and like pulverulent materials. A further object is to provide such equipment which will operate at substantially atmospheric pressures. A still further object is to provide equipment wherein losses of material in supplying and withdrawing material to and from the storage vessel is reduced to a negligible quantity. Other objects, together with some of the advantages to be derived in operating according to the present invention, will become apparent from the following detailed description thereof, taken together with the accompanying drawing forming a part of the specification and illustrating a preferred embodiment of the invention.

The single figure shown on the drawing is an elevational view of the system.

Referring to the drawing, a ground level storage vessel 1 of suitable capacity is provided with a discharge hopper 2 and a plurality of perforated aerating conduits, as for example at 3, air under pressure being supplied through conduit 4 from a source not shown. A metering valve 5 is provided in the bottom of hopper 2 and leads to conduit 6, which in turn leads from a point at or near the top of storage vessel 1 to conduit 8 through valve 7 past metering valve 5 and thence to a cyclone filter 9. A by-pass conduit 15 leads from conduit 6 at a point between valve 7 and storage vessel 1 to conduit 8 through valve 18. A conduit 20 including valve 19 also feeds into conduit 8. Filtered exit gases exit from cyclone filter 9 via conduit 22, being withdrawn by vacuum blower 21, and finally discharging through conduit 23.

Conduit 10 carries separated material from cyclone filter 9 through valve 11, conduit 12, valve 16, conduit 17 and thence to storage vessel 1. An air injector 24 is provided between valve 11 and conduit 12 as shown, being arranged and adapted to assist in passing material from conduit 10 to storage vessel 1 or through conduit 13 and valve 14, which lead from a T in conduit 12, to the point of use of the material being handled.

Storage vessel 1 is provided with an air vent 26 which may be conveniently located in the top manhole 25 at any other desired point above the level of material within storage vessel 1.

The operation of the equipment is carried out as follows: in filling storage vessel 1, valves 5, 7 and 14 are closed and valves 11, 16, 18 and 19 opened. Vacuum blower 21 is then started with the resulting effect of air being drawn to cyclone filter 9 through conduits 20 and 8 as well as through air vent 26, and conduits 6, 15 and 8. Pulverulent material to be stored in vessel 1 is admitted to conduit 8 through conduit 20 and valve 19. Conduit 20 leads from a source of supply such as railroad car or the like, and the pulverulent material while in conduit 20 is maintained in a fluidized state by means of an air injector or the like (not shown) in the same or similar manner as the arrangement shown at injector 24. The pulverulent material is thus carried through conduit 8 to cyclone filter 9, preferably, in the case of fluid catalysts, at a density of the order of 1 to 3 lbs./cubic foot and velocity of 15 to 35 feet per second. The pulverulent material is separated from the air stream in cyclone filter 9 and the solid material passed through conduit 10 and valve 11 from whence it is carried in a fluidized state through conduit 12, valve 16 and conduit 17 to storage vessel 1 by means of air admitted to conduit 12 through air injector 24. It will usually be found advantageous to partially close valve 18 during the filling operation in order to limit the air intake at air vent 26 to the minimum required for assuring an inward draft.

The carrier air entering through conduit 17 separates from the pulverulent material within storage vessel 1 and passes out through conduit 6, small amounts of entrained pulverulent material passing therewith and being returned to cyclone filter 9.

When it is desired to withdraw material from storage vessel 1, valves 5, 7, 11 and 14 are opened and valves 16, 18 and 19 closed. Air is admitted to the bottom of storage vessel 1 by means of perforated conduits as at 3 or the like in order to fluidize the material within the storage vessel in the region of the discharge hopper. The vacuum blower 23 is started with consequent passage of air through vent 26, conduits 6, 8, 22 and 23, this air serving to transport material from the discharge outlet of hopper 2 to cyclone filter 9, wherein the solid material is separated and again drops into conduit 10. Air admitted through air injector 24 serves to fluidize the material received from conduit 10 and transport the same through conduit 13 and valve 14 to the point of use.

Some of the advantages derived from the above described storage system are as follows:

The storage vessel is at all times open to the atmosphere and the necessity for pressure tight construction is thus obviated, in fact most standard liquid storage tanks, such as oil tanks, having sufficient capacity may be easily converted for use in storing fluid catalysts and the like by excavating to provide space for the necessary conduits and some form of hopper beneath the tank. In those instances wherein new construction is employed, the cost is greatly reduced by the facts that the storage vessel does not have to withstand pressure, either increased or reduced, and the expensive steelwork supporting structure required for elevated storage vessels of the conventional types is not needed. In either instance, if excavation is undesirable or impractical for any reason, the storage tank may be provided with foundations and elevated the small amount required to place the hopper and conduit beneath the tank and at approximately ground level. Further, although the storage vessel is open to the atmosphere, there is no loss of pulverulent material during charging, discharging or other operations wherein the mass of material is disturbed within the storage vessel, since during all operations there is a constant air flow into the storage vessel.

It will be appreciated, of course, that the above description relates only to a preferred embodiment of the invention and that variations in mechanical details thereof which do not materially alter the principle of operation will be apparent to those skilled in the art. Other types of separators may be substituted for the cyclone filter, as for example electrostatic precipitators, wool bag filters, cyclone separators utilizing centrifugal principles only, etc. Further, in the arrangement illustrated, valve 5 is a conventional loading valve, i. e., a valve primarily designed to control the loading of pulverulent material from the discharge hopper to the air stream in conduit 6 which is passed to the cyclone filter, in order to prevent over-loading to an extent sufficient to exceed the suction head of the vacuum blower. If a positive shut-off is employed at 5, conduit 15 may be eliminated and the air stream passed through conduit 6 during both charging and discharging operations.

I claim as my invention:

1. In a ground level system of the class described for handling and storing pulverulent materials, the combination comprising a storage vessel including a discharge hopper in the bottom thereof, means for fluidizing pulverulent material in said storage vessel in the vicinity of said discharge hopper, an atmospheric vent in said storage vessel above the material level therein, means for separating pulverulent material in a fluidized state from air, conduit means adapted to carry pulverulent material from said separation means to said storage vessel, means for maintaining pulverulent material in said conduit means in fluidized condition, a second conduit means in flow communication with said first named conduit means disposed between said fluidizing means and said storage vessel and adapted to carry pulverulent material in fluidized condition to a point of utilization, conduit means disposed beneath said discharge hopper in gravity flow communication therewith and in flow communication with the interior of said storage vessel at a point above the material level therein and in flow communication with said separation means, conduit means in flow communication at each end with said last named conduit means and by-passing said discharge hopper, a valve in said by-pass conduit, a valve in said conduit leading from said storage vessel to said separation means and disposed between said by-pass conduit and said discharge hopper, conduit means including a valve therein in flow communication with said conduit leading from said storage vessel to said separation means at a point between said discharge hopper and said separation means and leading from a source of pulverulent material, and a valve in the lower portion of said discharge hopper.

2. In a ground level system of the class described for handling and storing pulverulent materials, the combination comprising a storage vessel including a discharge hopper in the bottom thereof, a valve in the lower portion of said discharge hopper, an atmospheric vent in said storage vessel at a point above the material level therein, a cyclone filter, a vacuum blower connected on the intake side with said cyclone filter, conduit means between said cyclone filter and said storage vessel adapted to pass pulverulent material from said cyclone filter to said storage vessel, air injection means adapted to pass pulverulent material through said conduit means from said cyclone filter to said storage vessel, a second conduit means including a valve in flow communication with said last named conduit means and disposed between said air injection means and said storage vessel, a valve in said conduit means leading to said storage vessel between said second conduit means and said storage vessel, air injection means in said storage vessel adapted to maintain pulverulent material in the vicinity of said discharge hopper in a fluidized state, conduit means leading from within said storage vessel at a point above the material level therein passing beneath said discharge hopper in gravity flow communication therewith to said cyclone filter and supply conduit means including a valve in flow communication with said conduit means leading from the upper portion of said storage vessel to said cyclone filter, said supply conduit being disposed between said discharge hopper and said cyclone filter.

3. In a ground level system of the class described for handling and storing pulverulent materials, the combination comprising a storage vessel including a discharge hopper in the lower portion thereof, an atmospheric vent above the material level in said storage vessel, separation means, flow communication means leading from said storage vessel above the material level therein beneath said discharge hopper in gravity flow communication therewith and to said separation means and suction means in flow communication with said separation means whereby air and pulverulent material are withdrawn from said storage vessel through said flow communication means to said separation means.

4. In a ground level system of the class described for handling and storing pulverulent materials, the combination comprising a storage vessel including a discharge hopper in the lower portion thereof, an atmospheric vent above the material level in said storage vessel, separation means, flow communication means leading from said storage vessel above the material level therein beneath said discharge hopper in gravity flow communication therewith through a valve and to said separation means and suction means in flow communication with said separation means whereby air and pulverulent material are withdrawn from said storage vessel through said flow communication means to said separation means.

5. In a ground level system of the class described for handling and storing pulverulent materials, the combination comprising a storage vessel including a discharge hopper in the lower portion thereof, means for fluidizing pulverulent material in the vicinity of said discharge hopper, an atmospheric vent above the material level in said storage vessel, separation means, flow communication means leading from said storage vessel above the material level therein beneath said discharge hopper in gravity flow communication therewith and to said separation means and suction means in flow communication with said separation means whereby air and pulverulent material are withdrawn from said storage vessel through said flow communication means to said separation means.

6. In a ground level system of the class described for handling and storing pulverulent materials, the combination comprising a storage vessel including a discharge hopper in the lower portion thereof, an atmospheric vent above the material level in said storage vessel, separation means, flow communication means leading from said storage vessel above the material level therein beneath said discharge hopper in gravity flow communication therewith and to said separation means, suction means in flow communication with said separation means whereby air and pulverulent material in fluidized condition are withdrawn from said storage vessel through said flow communication means, means comprising said suction means for withdrawing separated air substantially free of pulverulent material from said separation means, discharge conduit means for withdrawing pulverulent material from said separation means and means for maintaining pulverulent material in said discharge conduit means in fluidized condition.

7. In a ground level system of the class described for handling and storing pulverulent materials, the combination comprising a storage vessel including a discharge hopper in the lower portion thereof, means for fluidizing pulverulent material in the vicinity of said discharge hopper, an atmospheric vent above the material level in said storage vessel, separation means, flow communication means leading from said storage vessel above the material level therein beneath said discharge hopper in gravity flow communication therewith through a valve and to said separation means, suction means in flow communication with said separation means whereby air and pulverulent material in fluidized condition are withdrawn from said storage vessel through said flow communication means, means comprising said suction means for withdrawing separated air substantially free of pulverulent material from said separation means, discharge conduit means for withdrawing pulverulent material from said separation means and means comprising an air injector in said discharge conduit means for maintaining pulverulent material in said discharge conduit means in fluidized condition.

8. In a ground level system of the class described for handling and storing pulverulent materials, the combination comprising a storage vessel including a discharge hopper in the lower portion thereof, means for fluidizing pulverulent material in the vicinity of said discharge hopper, an atmospheric vent above the material level in said storage vessel, a cyclone separator, conduit means leading in flow communication from said storage vessel above the material level therein beneath said discharge hopper in gravity flow communication therewith through a valve and to said cyclone separator, a vacuum blower having the intake side thereof connected to said cyclone separator and adapted to withdraw separated air substantially free of pulverulent material from said cyclone separator, discharge conduit means for withdrawing pulverulent material from said cyclone separator, means for maintaining pulverulent material in said discharge conduit means in fluidized condition, conduit means in flow communication with said discharge conduit means and said storage vessel and conduit means leading from a source of supply of pulverulent material to said cyclone filter and comprising in part said first named conduit means.

CURTIS W. CANNON.